United States Patent [19]
Johnson et al.

[11] 3,845,883
[45] Nov. 5, 1974

[54] MEASURING APPARATUS
[76] Inventors: Edward P. Johnson, 1579 Bucklin Ave.; Ross E. Waite, 1675 Argyle Ave., both of La Salle, Ill. 61301
[22] Filed: Jan. 6, 1972
[21] Appl. No.: 215,874

Related U.S. Application Data
[63] Continuation-in-part of Ser. No. 11,097, Feb. 13, 1970, abandoned.

[52] U.S. Cl. .................... 222/30, 222/70, 58/145 R
[51] Int. Cl. ............................................. B67d 5/22
[58] Field of Search .......... 322/30, 70, 153; 58/144, 58/145 R

[56] References Cited
UNITED STATES PATENTS
| | | | |
|---|---|---|---|
| 2,566,669 | 9/1951 | Lesnick | 222/153 |
| 3,170,597 | 2/1965 | Reichenberger | 222/30 X |
| 3,231,135 | 1/1966 | Starbuck | 222/70 X |
| 3,257,034 | 6/1966 | Dumm | 222/70 X |
| 3,467,279 | 9/1969 | Upton | 222/70 X |

FOREIGN PATENTS OR APPLICATIONS
| | | | |
|---|---|---|---|
| 625,381 | 1/1936 | Germany | 222/70 |
| 151,388 | 12/1902 | Germany | 58/145 R |

Primary Examiner—Robert B. Reeves
Assistant Examiner—Frederick R. Handren
Attorney, Agent, or Firm—Kirkland & Ellis

[57] ABSTRACT

Apparatus for indicating the amount of flowable material dispensed from a container includes a housing adapted to be secured to the container and a timer within the housing which measures the amount of time when the container is in a pouring orientation, thus providing an indication of the amount of material dispensed.

2 Claims, 10 Drawing Figures

PATENTED NOV 5 1974
SHEET 1 OF 2
3,845,883
FIG.2
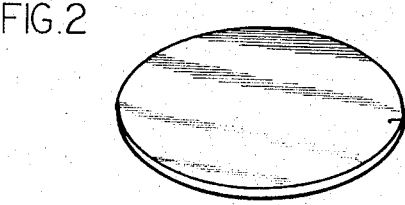
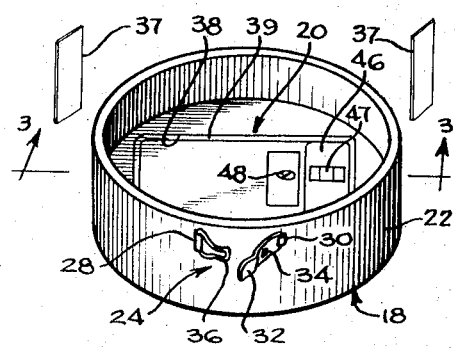
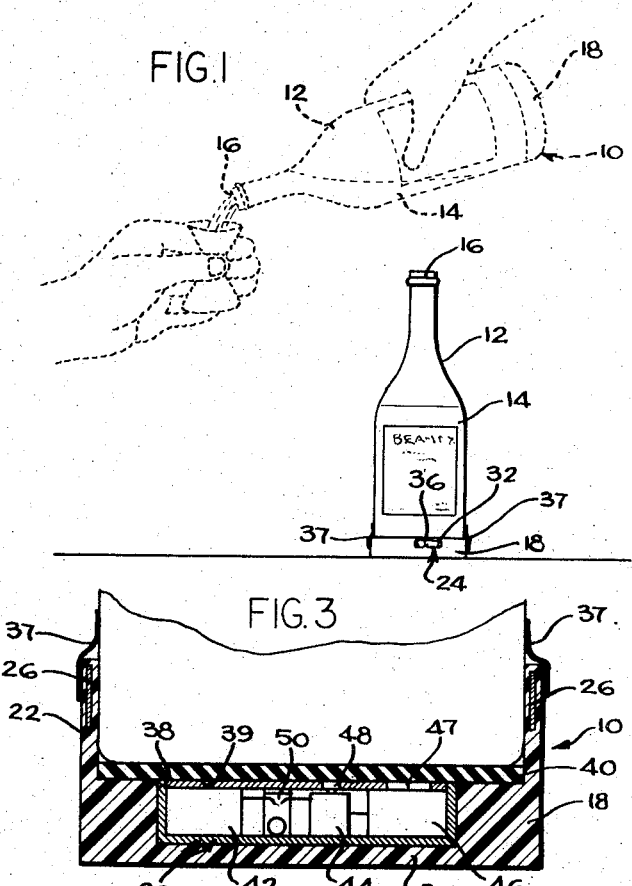
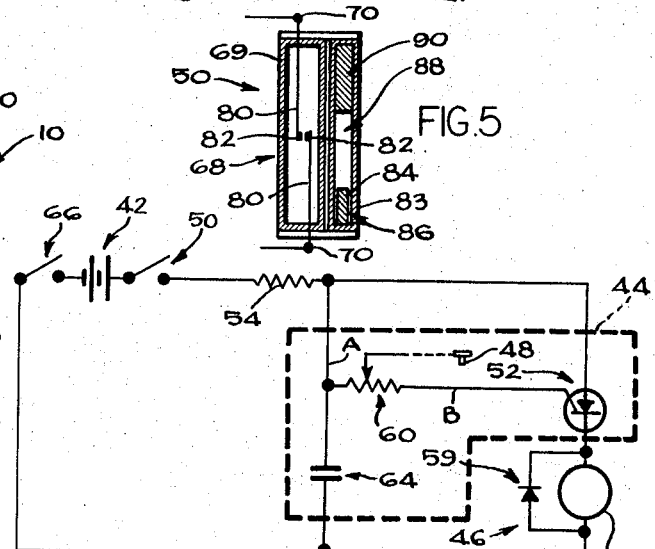
FIG.4
INVENTORS
EDWARD JOHNSON
ROSS E. WAITE
Anderson, Luedeka, Fitch, Even & Tabin
ATTYS.

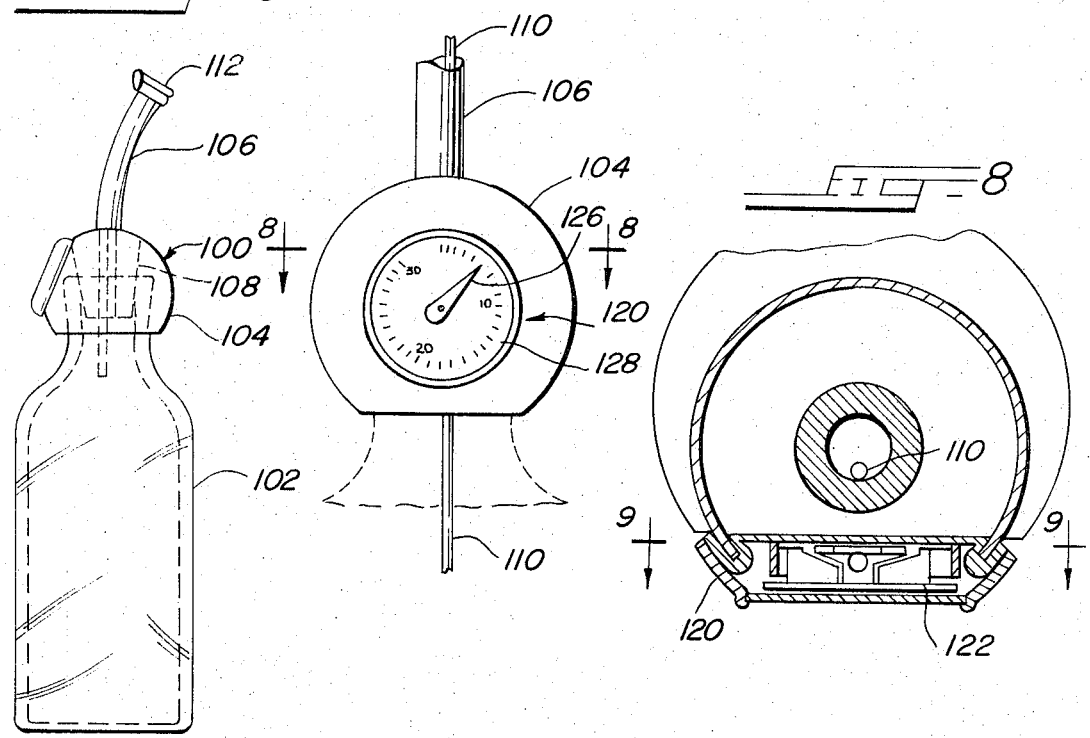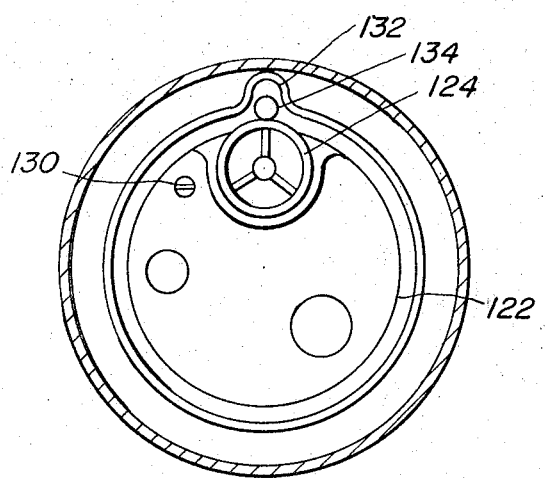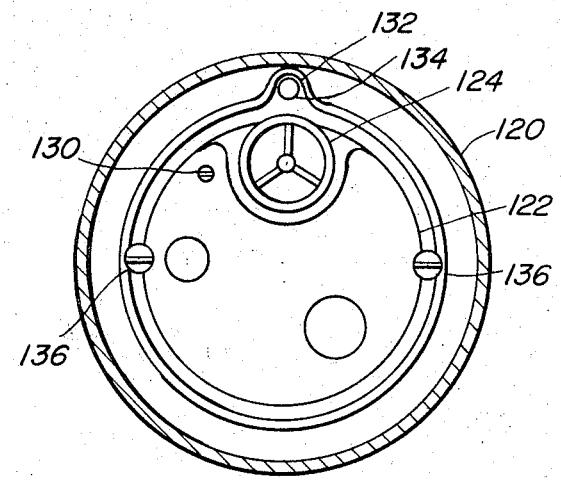

MEASURING APPARATUS

CROSS REFERENCE TO PRIOR CO-PENDING APPLICATION

This is a continuation-in-part application to application Ser. No. 11,097, filed Feb. 13, 1970 now abandoned.

BACKGROUND OF THE INVENTION

1. Field of the Invention

This invention relates to measuring apparatus and, more particularly, to apparatus for indicating the amount of flowable material, such as liquids or particulate solids, dispensed from a container.

2. Description of the Prior Art

In many situations it is desirable to provide a measurement and a record of the amount of flowable material dispensed from a portable container. One of the most common of such situations arises in taverns or other establishments where liquor is sold in individual servings from any of a large number of open bottles. Almost the only way in which adequate inventory control in such establishments can be accomplished is by measuring and recording the amount of liquor dispensed. Although keeping a record of bottles on hand may suffice for purposes of determining the amount of supplies to be purchased, it does not provide control over bartender practices in preparing drinks. It is well known in the trade that the profitability of a tavern can be greatly affected by these practices. Among the acts which can reduce profits are overgenerous servings, failure to collect for drinks served and consumption on the premises by employees.

Consequently a number of devices for measuring and recording the amount of liquor dispensed from a bottle have been developed. Many of these devices include complex and relatively expensive mechanisms such as flow meters which are actuated by passage of the liquor past the meter vanes. Other devices provide measuring chambers in which a specified quantity of liquor is collected before decanting. In both types of devices the liquor must pass through various mechanisms which may affect the purity, taste and quality of the liquor.

SUMMARY OF THE INVENTION

A measuring apparatus for indicating the amount of flowable material dispensed from a container when the container is held in a pouring position comprises a housing secured to the container, timing means within the housing for timing incremental time periods corresponding to a unit of volume of flowable material flowing from the container per incremental time period. Position responsive activating means are provided for initiating operation of the timing means in response to positioning the container in a pouring position and terminating operations of the timing means when the container is returned to a non-pouring position. Recording means are provided to record the total number of incremental time periods timed by the timing means and visual indicating means are provided to visually indicate the total number of incremental time periods timed by the timing means. Thus, the total number of units of volume of flowable material poured from the container is recorded and determinable by viewing the visual indicating means.

Accordingly, it is an important object of this invention to provide improved apparatus for indicating the amount of flowable material dispensed from a container.

Another object of the invention is to provide such an apparatus which measures and records the total amount dispensed and which functions without coming in contact with the dispensed material.

Yet another object of the invention is to provide such an apparatus especially adapted for liquor inventory control.

Still another object of the invention is to provide such an apparatus utilizing electronic components.

A further object of the invention is to provide such an apparatus which is inexpensive and easy to construct.

Still another object of the invention is to provide such an apparatus utilizing inexpensive mechanical components.

Other objects and advantages of the invention will become apparent from the following description, taken in connection with the drawings.

BRIEF DESCRIPTION OF THE DRAWINGS

FIG. 1 is a perspective view of a container for flowable material and measuring apparatus with a non-pouring orientation shown in solid lines and a pouring orientation shown in phantom.

FIG. 2 is an exploded perspective view of the container and apparatus shown in FIG. 1.

FIG. 3 is an enlarged cross sectional view of the apparatus taken along line 3—3.

FIG. 4 is a schematic diagram of the circuitry illustrated in FIG. 3.

FIG. 5 is a side view of another form of switch which may be used in the circuit.

FIG. 6 is a side plane view of an alternative embodiment of the present invention attached to a container.

FIG. 7 is a front view of the embodiment illustrated in FIG. 6.

FIG. 8 is a cross sectional partially fragmentary view taken substantially along line 8—8 in FIG. 7.

FIG. 9 is a cross sectional view taken substantially along line 9—9 in FIG. 8.

FIG. 10 is a cross sectional view identical to FIG. 9 except that the timing mechanism is shown in an operating condition.

DETAILED DESCRIPTION OF THE INVENTION

As shown in FIGS. 1-5, the improved measuring apparatus 10 is adapted for use with a container 12 for a flowable material 14 which container has an outlet 16 in its upper portion through which the material flows when the container is tipped into a pouring position. As specifically illustrated, the container is a conventional bottle, such as a liquor bottle, with a tapered neck terminating in a mouth at the extreme upper end. Of course, the apparatus is adapted for use with other forms of containers for other liquids or particulate flowable materials. Very generally the apparatus 10 includes a housing 18 adapted to be secured to the lower portion of the container and timing means 20 within the housing which measures the amount of time that the container is in a pouring orientation to provide an indication of the amount of material dispensed.

As illustrated, the housing is in the form of a cup with a base portion 21 on which the container is supported in its normal non-pouring orientation and an annular wall 22 extending upwardly from the base and surrounding at least part of the lower portion of the container. Preferably the base 21 and wall 22 are formed as an integral unit of plastic or rubber or similar somewhat resilient material and the inner circumference of the wall 22 is so sized as to provide a snug fit around the adjacent sides of the container 12.

A tight fit of the wall 22 around the container, or at least of the upper portion of the wall 22, is provided by clamping means 24. As illustrated, the clamping means comprises a metal band 26 embedded in the upper portion of the wall 22, extending almost entirely around the wall, and terminating at each end thereof in two tubular channels 28 and 30 which extend outwardly from the wall 22. The band 26 is caused to compress the wall 22 against the container by a pivotally movable catch plate 32 mounted in one of the channels and having a catch 34 which engages a loop 36 pivotally mounted in the other channel. Other equivalent fastening means could also be utilized.

Since an important function of the apparatus is to provide a measure of the amount of material dispensed by generally unsupervised employees and since the apparatus performs this function only when it is secured to the container, means are provided for detecting unauthorized removal of the housing from the container. As illustrated this means comprises one or more strips of light paper 37 provided with a strong adhesive on one side which are each attached to the upper portion of the wall 22 and the adjacent side of the container. This provides an inexpensive seal which is inevitably broken by unauthorized removal of the housing to indicate that such removal has taken place. More complex and expensive expedients could be locking devices provided on the clamping means 24.

The base portion 21 of the housing is provided with a recess 38 in its upper face within which is positioned a casing 39 for the timing means 18. As illustrated, a removable protective pad 40 is provided of a suitable resilient material such as rubber which fits within the wall 22 and rests on the upper face of the base portion 21, separating the casing 39 and container.

The timing means 18, as illustrated generally in FIG. 3, includes a d-c power supply 42 such as an electrochemical storage battery, pulse generating means 44 which produces pulses at a selected rate of repetition, i.e., at time intervals of a selected duration and a counter 46 with a display dial 47 for counting the pulses produced by the pulse generator. Adjustment means 48 are provided for adjusting the duration of the selected time intervals. A switch 50 which is designed to be responsive to orientation is provided to connect the power source 42 and the counter 46 when the container is in a pouring orientation.

As illustrated in FIG. 3, switch 50 is a ball switch substantially vertically oriented in the housing when it is secured to the container in a non-pouring position. The contacts of the ball switch are at its upper end so that when the container is tipped into a pouring position, the ball rolls toward the contacts and completes the circuit between the power source and the counter. Thus in operation, movement of the container from a non-pouring orientation to a pouring orientation actuates the switch 50 and causes pulses produced by the pulse generator 44 to be counted. The rate at which pulses are generated is adjusted by the adjustment means 48 in the form of a set screw, taking into consideration the dimensions of the container outlet and the flow characteristics of the material in the container to provide a measure in any desired units of the amount of material dispensed. Typical rates of repetition for liquor bottles may be between 0.5 sec. and 2.5 sec. The adjustment set screw, preferably and as illustrated is positioned on the top face of the casing 39 within the cup so as to be inaccessible for tampering without removing the apparatus from the container.

The display dial 47 is also, as illustrated, on the top face of the housing to prevent employees from observing the reading thereof without removing the apparatus from the container. This arrangement will prevent such schemes as bartenders giving customers short servings, thus creating ill will, while taking the balance for themselves. If desired, however, the display dial may be located on the outside of the housing.

A more detailed schematic illustration of the circuitry especially adapted for this purpose is shown in FIG. 4. As there shown, a relaxation oscillator with repetitive pulse forming ability utilizes a silicon controlled rectifier 52 with anode in series with resistor 54, orientation responsive switch 50 and battery 42. The cathode of SCR 52 is connected to counter coil 58 which actuates the counter display dial 47 (FIG. 3). A high current discharge of SCR 52 operates counter coil 58. Diode 59 is connected across counter coil 58 to absorb 180° out of phase transients when the coil ceases to conduct. The rate of pulse repetition is determined by the resistance of potentiometer 60 connected between resistor 54 and the gate of SCR 52. Potentiometer 60 is a variable resistance adjusted by an adjustment screw 48. Capacitor 64 is connected to battery 42 through a manual switch 66 and between resistor 54 and potentiometer 60.

During shipment or other periods of non-use exhaustion of the battery 42 is prevented by placing the manual switch 66 in its open position. Before securing the housing to the container switch 66 is closed. Nevertheless, when the container is in a non-pouring position, orientation responsive switch 50 is open. When the container is tipped to a pouring orientation, switch 50 closes and capacitor 64 and the gate of SCR are charged by battery 42. When the voltage on capacitor 64 rises to a sufficient value, as determined by the adjusted resistance to potentiometer 60 the capacitor discharges through the potentiometer 60 and causes the SCR to conduct for a brief period, thus registering a count of one unit on the counter 46 equivalent to a decanting time determined by the potentiometer adjustment. If the container is held in a pouring position, capacitor 64 and the gate of SCR 52 will again begin to charge and the counting will be repeated at the selected time intervals. When the container is returned to a non-pouring position, switch 50 opens and the counting ceases.

An alternative arrangement which can provide an almost instantaneous count when the container is placed in a pouring position and thereafter counts at selected intervals may be provided by placing the orientation responsive switch 50 in the gate circuit, i.e., at points A or B. In this arrangement, capacitor 64 is always charged so that upon the closing of switch 50 the SCR discharges almost instantaneously. Thereafter, the rate of counting is at the preselected intervals determined by the adjustment of the potentiometer.

Another form of orientation responsive switch 50 which may be advantageously utilized, is shown in FIG. 5. A reed switch 68 comprising an elongated tube 69 with output connections 70 at each end is substantially vertically oriented in the housing as is is secured to the container. Extending from each end of the tube toward the central portion are flexible conductive leafs 80 which overlap one another at contact ends 82 normally spaced from one another. As illustrated a second tube 83 is attached to the switch tube 69 and carries a permanent magnet 84 movable along the second tube from a position 86 adjacent the lower end of the switch tube to a position 88 adjacent the overlapping contacts 82. As shown the two tubes are the same length and the upper end of the magnet tube 84 is filled with a solid material 90 to determine the position 88. However, the magnet tube 84 could simply be made shorter and attached to the lower portion of the switch tube. In operation movement of the container to a pouring position causes the magnet 84 to move to position 88. The magnetic field of the magnet thus causes the two contact ends 82 to touch one another, completing the circuit. Return of the container to a non-pouring position causes the magnet to fall to position 86 and the circuit to open.

With reference to FIGS. 6-10, measuring apparatus 100 is attached to container 102. Measuring apparatus 100 comprise housing 104 having a pouring stem 106 which communicates through housing 104 to the interior of container 102. Attached to the interior of housing 104 is bung 108 which is inserted into the open end of container 102 to hold housing 104 to container 102. Also provided within stem 106 is air relief tube 110 which permits air to enter container 102 as liquid is being poured from stem 106. Thus, when container 102 is oriented in a horizontal pouring position, the liquid contents of container 102 flow through bung 108 and stem 106.

Provided at the end of stem 106 is gravity actuated closure 112 which covers the end of stem 106 when container 102 is in an upright position to prevent debris and air born contaminants from entering container 102 through stem 106. When container 102 is in a pouring orientation, closure 112 opens to permit the contents of container 102 to flow from stem 106.

Also attached to housing 104 is timing means enclosure 120. Within timing means enclosure 120 is a conventional watch mechanism 122 having escapement fly wheel 124 powered by a watch spring (not shown). On the face of watch mechanism 122 is a single indicator hand 126 which rotates to traverse a face 128. Face 128 is divided into increments representing units of volume of liquid. Typically the units of volume would be liquid ounces or "shots" (1½ ounces) of liquid. Watch mechanism 122 has adjustment screw 130 which adjusts the frequency of rotational oscillation of escapement fly wheel 124 during operation of watch mechanism 122 so that the speed rotation of indicator hand 126 around face 128 indicates on face 128 the volume of liquid flowing through stem 106.

Provided within timing means enclosure 120 is a roller ball recess 132 in which is positioned a roller ball 134. Watch mechanism 122 is positioned within the timing means enclosure 120 and held by screws 136 so that escapement fly wheel 124 is adjacent roller ball recess 132. When container 102 is in an upright non-pouring position as illustrated in FIG. 6, roller ball 134 falls by gravity against escapement fly wheel 124 as shown in FIG. 9 to stop the rotational oscillation of fly wheel 124, and thus stop the rotation of indicator hand 126 across face 128. However, when container 102 is oriented to a pouring position, roller ball tends to roll by gravity away from escapement fly wheel 124, thus permitting escapement fly wheel 124 to start rotational oscillation causing indicator hand 126 to rotate around face 128. Once pouring is completed, and container 102 is returned to an upright non-pouring position, roller ball 134 rolls back against escapement fly wheel 124 to stop the operation of watch mechanism 122.

By adjusting adjustment screw 130 to control the frequency of rotational oscillation of fly wheel 124, the speed of rotation of indicator hand 126 can be adjusted. By careful adjustment of adjustment screw 130, watch mechanism 122 can be adjusted so that indicator hand rotates one increment for each unit of volume that flows through stem 106. Thus, the total volume of liquid poured from container 102 can easily be determined by viewing the position of indicator hand 126 on face 128.

Thus, it may be seen that an inexpensive apparatus for measuring the amount of flowable material dispensed from a container has been provided. Various changes and modifications could be made in the above described apparatus without departing from the invention. For example, other forms of containers could be utilized and flowable materials other than liquor could be measured, all of which fall within the spirit and scope of the invention, features of which are set forth in the accompanying claims.

We claim:

1. An apparatus for indicating the amount of flowable material dispensed from a container having an outlet in the upper portion thereof when the container is held in a pouring position comprising:

a housing secured to the container;

timing means within said housing comprising a mechanical watch mechanism having a rotationally oscillating escapement fly wheel, said timing means for timing incremental time periods, each said incremental time period corresponding to a unit of volume of the flowable material flowing from the outlet per incremental time period when the container is held in the pouring position;

position responsive activating means within said housing comprising a roller ball positioned adjacent said fly wheel so that said roller ball will contact said fly wheel to prevent rotational oscillation of said fly wheel when the container is in a non-pouring position and will roll away from said fly wheel to permit rotational oscillation of said fly wheel when the container is in a pouring position;

recording means within said housing for recording the total number of incremental time periods timed by said timing means;

visual indicating means within said housing for providing externally viewable numerical representations of the total number of incremental time periods recorded by said recording means, said visual indicating means comprising an indicator hand rotated by said watch mechanism and a watch face divided into increments of volume so that when said indicator hand is rotated by said watch mechanism the total volume of flowable material flowing from the container is visually indicated.

2. An apparatus for indicating the amount of flowable material dispensed from a container having an outlet in the upper portion thereof when the container is held in a pouring position comprising:

a housing secured to the container;

a watch mechanism within said housing, said watch mechanism for timing incremental time periods, each said incremental time period corresponding to a unit of volume of the flowable material flowing from the outlet per incremental time period when the container is held in the pouring position, said watch mechanism including an escapement fly wheel which rotationally oscillates when said watch mechanism is operating;

position response activating means within said housing adjacent to said escapement fly wheel, said activating means for disengaging said fly wheel so that said watch mechanism begins operation to time incremental time periods in response to positioning the container in the pouring position and engaging said fly wheel when the container is in a non-pouring position to terminate operation of said watch mechanism;

an indicator operably connected to said watch mechanism for rotation upon activation of said watch mechanism;

a watch face calibrated in units of volume attached to said watch mechanism so that said indicator traverses said face to visually indicate the total number of units of volume of flowable material poured from the container.

* * * * *